(12) United States Patent
Luglio et al.

(10) Patent No.: US 7,706,757 B2
(45) Date of Patent: *Apr. 27, 2010

(54) WIRELESS COMMUNICATION SYSTEM

(75) Inventors: Juan R. Luglio, Wauwatosa, WI (US);
Kurt J. Nemer, Mukwonago, WI (US)

(73) Assignee: Silver Spring Networks, Inc., Butler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/020,060

(22) Filed: Jan. 25, 2008

(65) Prior Publication Data

US 2008/0117110 A1 May 22, 2008

Related U.S. Application Data

(63) Continuation of application No. 10/396,980, filed on Mar. 25, 2003, now Pat. No. 7,406,298.

(51) Int. Cl.
*H04B 1/38* (2006.01)

(52) U.S. Cl. .................... 455/90.3; 455/90.1; 455/90.2; 455/575.1; 455/575.8; 455/556.1; 455/344; 455/347; 455/349; 348/143; 348/149; 340/500; 340/506; 340/517; 340/531

(58) Field of Classification Search ....... 455/90.1–90.3, 455/575.1, 575.8, 556.1, 572–574, 344, 347, 455/349; 348/149, 151, 143; 340/500, 506, 340/511, 517, 521, 531–532
See application file for complete search history.

(56) References Cited

U.S. PATENT DOCUMENTS

| 4,731,551 | A | * | 3/1988 | Gibbs et al. ................. 307/141 |
| 4,998,095 | A | * | 3/1991 | Shields ....................... 340/574 |
| 5,789,868 | A | | 8/1998 | Sears |
| 5,886,738 | A | * | 3/1999 | Hollenbeck et al. ......... 348/151 |
| 5,963,178 | A | | 10/1999 | Jones |
| 6,055,434 | A | * | 4/2000 | Seraj ........................ 455/456.1 |
| 6,259,476 | B1 | * | 7/2001 | Greene ....................... 348/151 |
| 6,452,339 | B1 | * | 9/2002 | Morrissey et al. ........... 315/149 |
| 6,483,470 | B1 | * | 11/2002 | Hohnstein et al. ........... 343/721 |
| 6,636,150 | B2 | * | 10/2003 | Williams .................... 340/506 |
| 7,379,981 | B2 | | 5/2008 | Elliott et al. |

* cited by examiner

*Primary Examiner*—Tuan A Tran
(74) *Attorney, Agent, or Firm*—Michael Best & Friedrich LLP

(57) ABSTRACT

A wireless communication apparatus adapted to be mounted on an elevated surface having an electrical socket thereon. The apparatus includes a housing, a photocell and a transceiver. The housing at least partially defines an interior space and has a portion which is translucent. The photocell is supported by the housing in the interior space so that ambient light exterior to the housing passes through the translucent portion to the photocell. The transceiver is also supported by the housing and is positioned within the interior space of the housing.

34 Claims, 4 Drawing Sheets

US 7,706,757 B2

WIRELESS COMMUNICATION SYSTEM

RELATED APPLICATION

The present application is a continuation of co-pending U.S. patent application Ser. No. 10/396,980, filed Mar. 25, 2003, the entire contents of which are hereby incorporated by reference.

BACKGROUND OF THE INVENTION

The present invention relates generally to a mounting arrangement for an electronic device, and particularly to a wireless communication system mounted on an elevated surface.

There are many wireless communication systems which include a stationary antenna for receiving signals transmitted by an end device, transmitting signals to be received by an end device and/or relaying signals from a transmitting antenna to a receiving antenna. In these and other wireless communication systems, the location of the antenna is very important. For example, an antenna located on an elevated surface provides an increased coverage area (i.e., the area to which the antenna can transmit signals and/or from which the antenna can receive signals) and sometimes provides a clear line of sight radio path between the antenna and the end user.

Currently, antennas are mounted atop elevated surfaces such as one might find on buildings, light poles, towers, etc. When the antenna is mounted or positioned on the elevated surface, various electrical connections need to be established. In some environments, providing power to the transmitter, receiver and/or transceiver is simple. In other environments, establishing the necessary electrical connections is more complex.

SUMMARY OF THE INVENTION

When a wireless communication system, such as an antenna and corresponding electronics (e.g., a transmitter, a receiver, a transceiver, etc.), is mounted to a utility or light pole, the system typically receives power from an electrical socket located on top of the light fixture mounted on the pole. The socket normally mates with a removable photosensitive switch or photocell, or combination thereof which activates or controls the light. Hereafter, all photosensitive switches, photocells, photoelectric cells, detectors, or combinations thereof will simply be referred to as "photocells".

Present wireless communication systems that are mounted to light poles include a power module or power tap connected to a communication system. The communication system is usually mounted on the vertical pole-portion of the light pole (see for example FIG. 1, which is an illustration of prior art systems). The power tap is positioned between the photocell and socket and distributes power to both the photocell and the communication system. Power is distributed to the communication system via wiring and/or cables, since the antenna and corresponding electronics in the prior art systems are positioned within another module separate from the power tap. In the prior art, the module housing the antenna and corresponding electronics is typically mounted on another location or position on the light pole. However, there is limited space to mount the communication system or other systems on the pole. Thus, it is desirable to have a wireless communication system or apparatus that integrates the system components, i.e., the photocell, power tap, communication system, and other electronics, within one module or housing.

Accordingly, the invention provides an apparatus to connect to a light fixture mounted on a light pole. The apparatus includes a housing and a plurality of circuit supports. Each circuit support at least partially defines an area in which an electrical circuit can be positioned. In some constructions, a circuit support can support a power circuit, a radio frequency ("RF") communication card, a transmitting circuit, a receiving circuit, a transceiver circuit, a photosensitive switch circuit, a gateway circuit, or another suitable electrical circuit.

In one embodiment, the invention provides an apparatus to mount to an elevated surface having an electrical socket. The apparatus includes a housing at least partially defining an interior space. The housing includes a portion that is substantially translucent. A photocell supported by the housing is positioned within the interior space so that ambient light that is outside the housing passes through the translucent portion to the photocell. A transceiver supported by the housing is also positioned within the interior space of the housing.

In another embodiment, the invention provides a wireless communication system to mount to an elevated surface, such as a light pole. The system includes a housing which at least partially defines an interior space. An electrical connector supported by the housing mates with an electrical socket included on the elevated surface, such as, an electrical socket positioned on top of a light pole. The system also includes a power circuit, a transceiver and an antenna, all of which are supported by the housing. The power circuit couples to the electrical connector, and the transceiver couples to the power circuit. The antenna couples to the transceiver.

In yet another embodiment, the invention provides an apparatus to mount to an elevated surface having an electrical socket. The apparatus includes a housing which at least partially defines an interior space. An electrical connector supported by the housing mates with the electrical socket. When the electrical connector mates with the socket, the housing is supported on the elevated surface. The apparatus also includes an antenna and a circuit support, both supported by the housing. The circuit support partially defines an area for positioning an electrical circuit.

In a further embodiment, the invention provides an apparatus to mount on a light fixture. The light fixture includes a surface and has an electrical socket positioned on the surface. The apparatus includes a housing, which at least partially defines an interior space, and an electrical connector. The electrical connector is supported by the housing and directly connects to the electrical socket. When the connector connects to the socket, the housing is supported on the surface.

Figure 1:
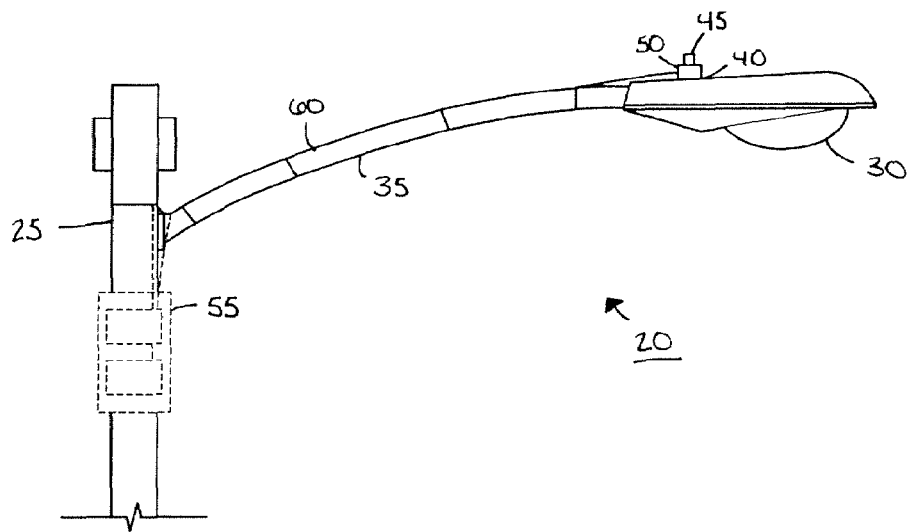
FIG. 1 is a partial elevation view of a prior art wireless communication system.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," "supported," and "coupled" are used broadly and encompass both direct and indirect mounting, connecting, supporting, and coupling. Further, "connected" and "coupled" are not restricted to physical or mechanical connections or couplings. The use of the term "radio frequency" refers to the portion of the electromagnetic spectrum that is between approximately 3 kHz to approximately 300 GHz.

DETAILED DESCRIPTION

FIG. 1 illustrates a prior art wireless communication apparatus 20 mounted on a utility pole 25. The utility pole 25 includes a light fixture 30 connected to the pole 25 via an extension pole 35. The light fixture 30 includes an electrical socket 40 positioned on top of the fixture 30. The electrical socket 40 is configured to mate with a photocell 45.

As shown in FIG. 1, the prior art apparatus 20 includes a power module or power tap 50 and an antenna and electronics module 55. The power tap 50 and antenna and electronics module 55 are encased in separate housings and are connected via cables or wires 60. The power tap 50 is positioned between the electrical socket 40 and the photocell 45 and distributes power to the photocell 45 and the antenna and electronic module 55.

FIGS. 2-6 illustrate the wireless communication system or apparatus 100 embodying the invention. The wireless communication apparatus 100 is preferably mounted on a utility pole, such as the utility pole 25 shown in FIG. 1 and the utility pole 300 shown in FIG. 6. In other constructions and in other embodiments (not shown), the apparatus 100 is mounted on any other type of apparatus that provides an elevated surface having an electrical socket thereon.

Figure 2:
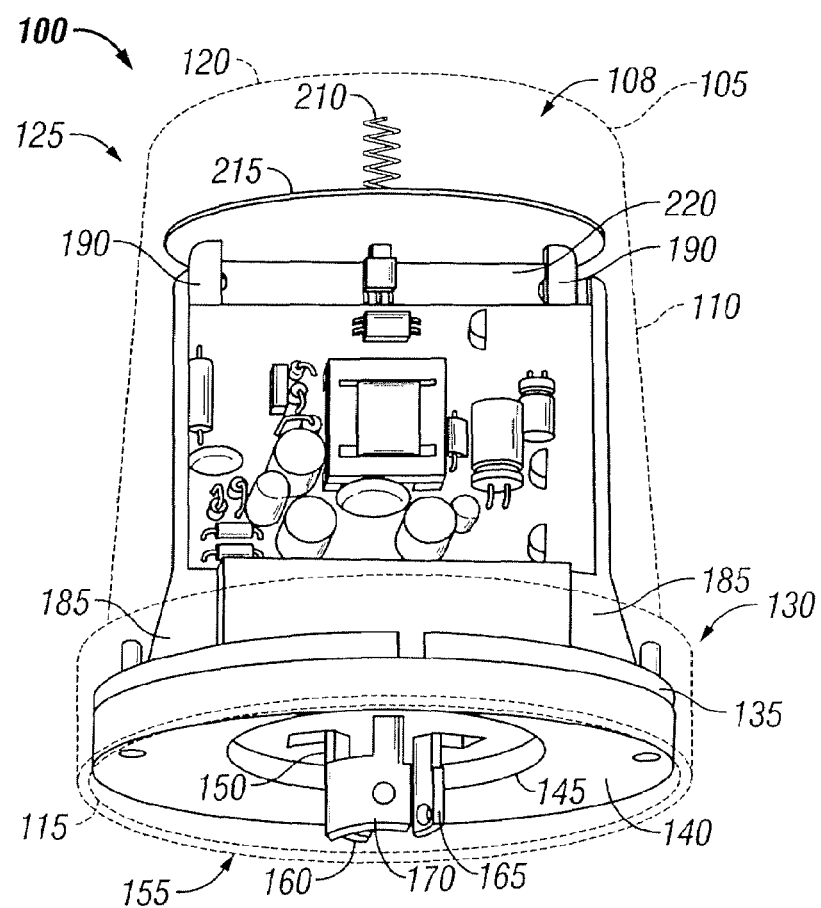
FIG. 2 is a perspective view of a wireless communication apparatus embodying the invention.
Figure 3:
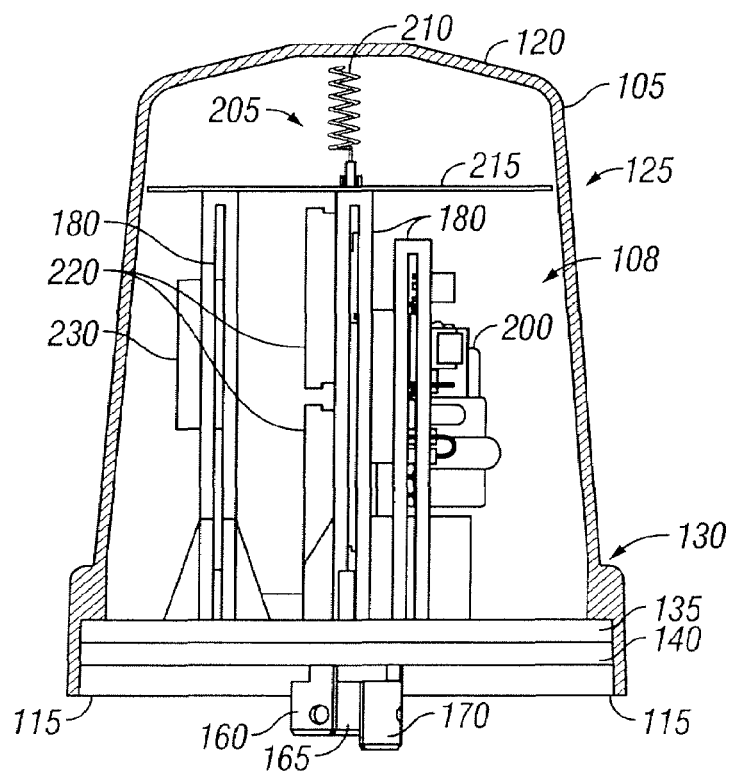
FIG. 3 is a side view of the wireless communication apparatus shown in FIG. 2 with a portion of the housing broken away.
Figure 4:
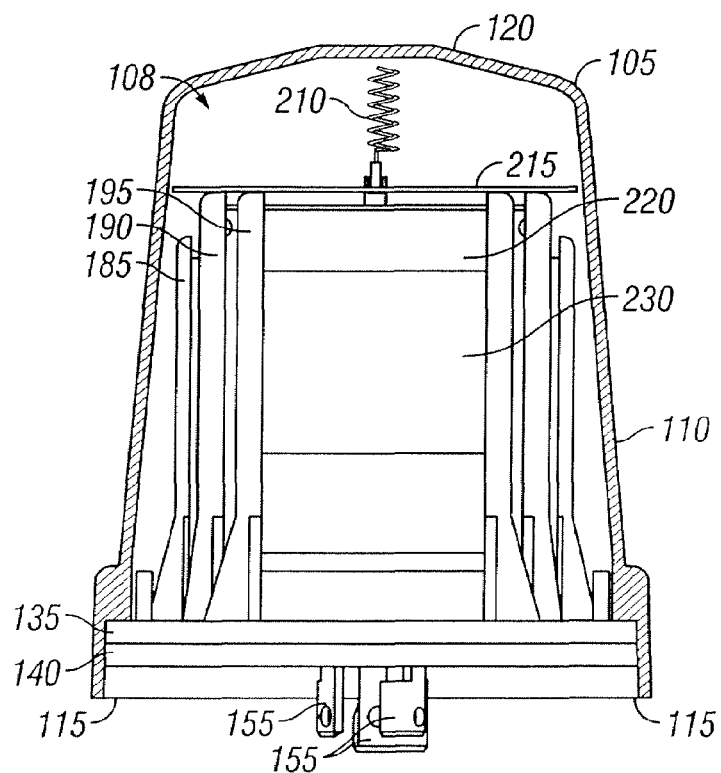
FIG. 4 is a rear view of the wireless communication apparatus shown in FIG. 2 with a portion of the housing broken away.

The wireless communication apparatus 100 includes a cover or housing 105. In FIG. 2, the housing 105 is shown in dashed lines. In FIGS. 3 and 4, the housing 105 is broken away, that is, shown in cross-section, to view the components contained within the housing 105. In the illustrated embodiments, the housing 105 defines an interior space 108.

The housing 105 is substantially cylindrical and includes a sidewall 110 defining an aperture 115 and a top wall 120 coupled to the sidewall 110. As shown in FIGS. 2-5, a top portion 125 of the housing 105 has a diameter that is less than the diameter of a bottom portion 130 of the housing 105. The housing 105 also includes a base 135 coupled to the sidewall 110. The base 135 is positioned within the aperture 115 defined by the sidewall 110. In the illustrated embodiment, the base 135 is substantially circular. In some embodiments and in some constructions, the housing 105 varies in shape and/or size and the housing 105 may include more or fewer walls than the embodiment illustrated in FIGS. 2-5.

In some embodiments, the housing 105 is formed from a substantially non-conductive material, such as plastic. The sidewall 110 and top wall 120 of the housing 105 are formed as an integral unit by injection molding, and the base 135 of the housing 105 is formed as a separate component. In other embodiments (not shown), the sidewall 110, top wall 120 and base 135 are separate components and are coupled together using appropriate means readily apparent to those of skill in the art. Preferably, the housing 105 is formed from a translucent material or another material that allows ambient light to pass through the housing 105. In other embodiments, a portion of the housing 105 is sufficiently translucent and allows exterior ambient light to pass through the translucent portion of the housing 105.

An annular gasket 140 defining a gasket aperture 145 is positioned within the aperture 115 defined by the housing 105. The gasket 140 is positioned underneath the base 135 of the housing 105. In some constructions, the gasket 140 couples to the base 135. In the illustrated embodiment, the gasket 140 is substantially circular and is positioned to substantially fill the aperture 115.

The apparatus 100 also includes an electrical connector 150 supported by the base 135 of the housing 105. As shown in FIGS. 2-5, the electrical connector 150 extends through the gasket aperture 145. The electrical connector 150 includes a plurality of electrical terminals 155 to receive power from an electrical socket. In the illustrated embodiment, the electrical connector 150 is a three-prong male terminal having a hot or power terminal 160, a neutral terminal 170 and a switched-line terminal 165. The electrical connector 150 is configured to receive approximately an 120-volt output signal to approximately a 480-volt output signal from an electrical socket through the power terminal 160 and neutral terminal 170, and is configured to transfer signals and/or control the electrical load, such as a light fixture, through the switched-line terminal 165. In other constructions, the electrical connector 150 includes more or fewer electrical terminals than the embodiment shown and is configured to receive a higher or lower voltage signal than the embodiment shown.

The apparatus 100 also includes a plurality of circuit supports 180 coupled to the base 135 of the housing 105. Each circuit support included in the plurality of circuit supports 180 partially defines an area for positioning an electrical circuit, such as, for example, a power circuit, a communication circuit, a transmitting circuit, a receiving circuit, a transceiver circuit, a photocell circuit, a gateway circuit, or another suitable electrical circuit. When an electrical circuit is positioned in one of the plurality of circuit supports 180, the electrical circuit is electrically coupled to the electrical connector 150 either directly, or through an electrical bus (not shown) commonly connected to all circuits that reside in the various circuit supports 180, or through another circuit. That is, the electrical circuit receives power and/or other signals (as appropriate) from the electrical connector 150 either directly or via another circuit or the bus. In the illustrated embodiment, the plurality of circuit supports 180 includes a first circuit support 185, a second circuit support 190 and a third circuit support 195. In other constructions and in other embodiments, the plurality of circuit supports 180 includes more or fewer circuit supports than the embodiment shown.

Figure 5:
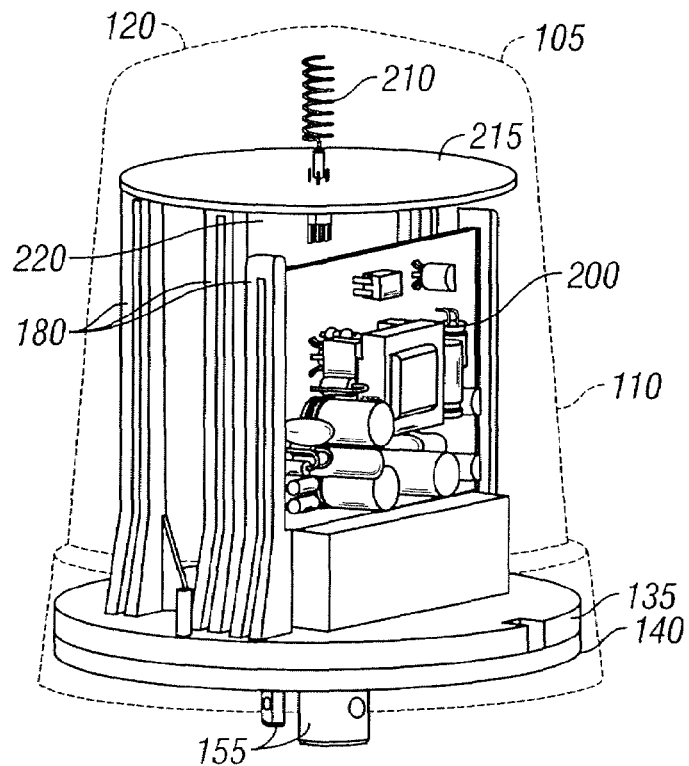
FIG. 5 is another perspective view of the wireless communication apparatus shown in FIG. 2.

As shown in FIGS. 3 and 5, the apparatus 100 also includes a power supply circuit or power circuit 200 supported by the first circuit support 185. The power circuit 200 electrically couples to the electrical connector 150 and receives power from the connector 150. The power circuit 200 also distributes power to various components and/or additional circuits included in the apparatus 100. In some constructions, the power circuit 200 filters the electrical signal received by the connector 150. In the illustrated embodiment, any additional circuits supported by the circuit supports 180 are coupled to the electrical connector 150 via the power circuit 200.

The apparatus 100 also includes an antenna module or antenna 205 for transmitting and/or receiving wireless signals. In the illustrated embodiment, the antenna 205 transmits and receives signals at approximately 900 MHz using a direct sequence spread spectrum modulation technique. In some constructions, the antenna 205 transmits and/or receives signals at another frequency and/or uses a different modulation technique.

In some embodiments, such as the embodiment shown in FIGS. 2-5, the antenna 205 includes a radiating element 210 and a ground plane 215 for transmitting and/or receiving wireless signals. In the illustrated embodiments, the radiating element 210 is positioned substantially above the ground plane 215. In the illustrated embodiment, the ground plane 215 is a circular disc and is formed from an electrically conductive material, such as, for example, a printed circuit board having one or more sides coated with copper or another suitable conductive material. In other embodiments, the antenna 205 does not include a ground plane 215.

The apparatus 100 also includes an RF communication card 220 coupled to the radiating element 210 or to the antenna 205. As shown in FIGS. 2-5, the RF communication card 220 is supported by the second circuit support 190. The RF communication card 220 includes a microprocessor and a transceiver. The microprocessor processes the wireless signals and controls the various components on the card 220, for example, the RF communication card 220 and the antenna 205, in order to provide relay functions for transferring RF signals to an external device. In other constructions, the microprocessor also includes gateway functions for connecting one network to another and for routing information between networks. In further constructions, the RF communication card 220 includes a separate transmitter and/or a separate receiver.

The apparatus 100 also includes a photocell circuit 230 supported by one of the plurality of circuit supports 180. In the illustrated embodiment, the third circuit support 195 supports the photocell circuit 230. In the illustrated embodiment, the photocell circuit 230 includes a photocell (not shown) for activating a light positioned on the utility pole, such as the light fixture 30 positioned on the utility pole 25 shown in FIG. 1. The photocell activates the light, such as the light fixture 30, by controlling power to the light fixture 30 through the switched-line terminal 165 of the electrical connector 150. In other embodiments, the RF communication card 220 activates the light through the switched-line terminal 165 in response to an RF signal received by the receiver or transceiver.

In some constructions, the photocell circuit 230 is a time photocell switching circuit, such as the circuit described in U.S. Pat. No. 5,789,868, the entire content of which is incorporated herein by reference. As shown in FIGS. 2-5, the photocell circuit 230 is positioned near the sidewall 110 of the housing 105 in order to sense ambient light. In these constructions, the housing 105 or a portion of the housing 105 is formed from a sufficiently translucent material.

Figure 6:
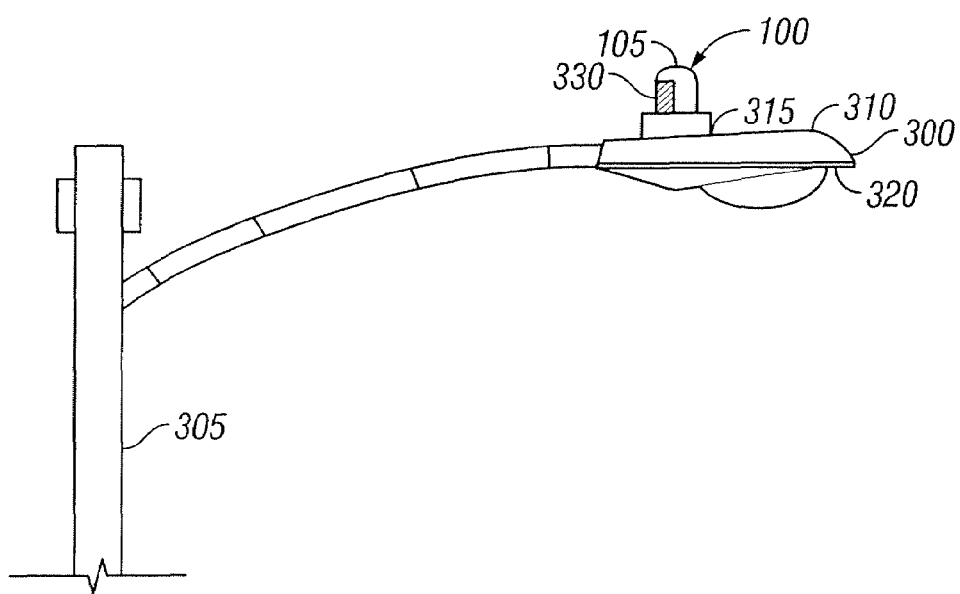
FIG. 6 is a partial elevation view of the wireless communication apparatus shown in FIG. 2 mounted on an elevated surface.

FIG. 6 illustrates an embodiment of the invention in which the apparatus 100 mounts to a light fixture 300 coupled to a utility pole 305. As shown in FIG. 6, the light fixture 300 and utility pole 305 are similar to the light fixture 30 and the utility pole 25 shown in FIG. 1. The light fixture 300 includes a surface 310 and an electrical socket 315 positioned on the surface 310. As shown in FIG. 6, the apparatus 100 mounts to the surface 310 of the light fixture 300 when the electrical connector 150 connects to the electrical socket 315. In the illustrated embodiment, the housing 105 of the apparatus 100 includes a translucent portion 330. The translucent portion 330 allows ambient light exterior to the housing 105 of the apparatus 100 to pass through the housing 105 to the photocell included in the photocell circuit 230.

Figure 7:
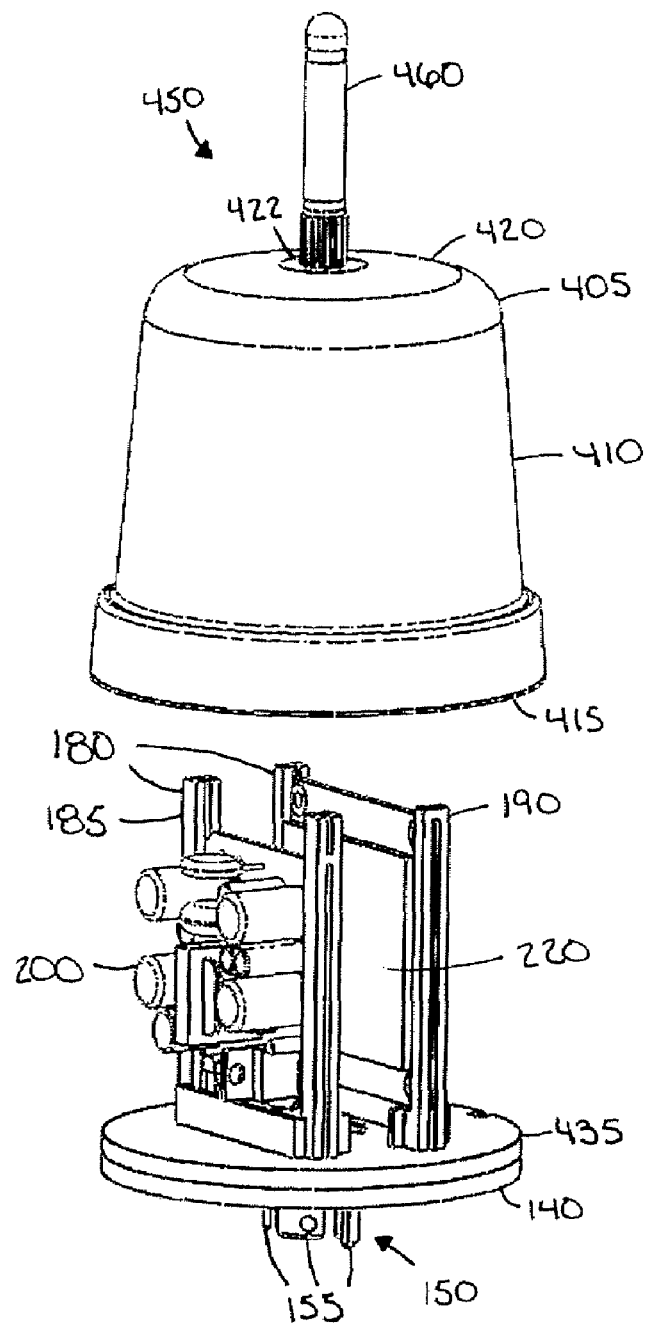
FIG. 7 is an exploded view of another wireless communication apparatus embodying the invention.

FIG. 7 illustrates another wireless communication system or apparatus 400 embodying the invention. Common elements have the same reference number as shown in the drawings relating to the wireless communication apparatus 100. The apparatus 400 is also configured to mount on a utility pole, such as utility poles 25 and 305, and operable to activate or control a light, such as the light fixtures 30 and 300.

Referring to FIG. 7, the apparatus 400 includes a conductive housing 405. The housing 405 is substantially cylindrical and includes a sidewall 410 defining a first aperture 415. The housing 405 also includes a top wall 420 defining a second aperture 422 and coupled to the sidewall 410. In some embodiments, the sidewall 410 defines the second aperture 422. The housing 405 further includes a base 435 coupled to the sidewall 410. In the illustrated embodiment, the base 435 is substantially circular. In some embodiments and in some constructions, the housing 405 varies in shape and/or size and the housing 405 may include more or fewer walls than the embodiment illustrated in FIG. 7. In other embodiments, the housing 405 of apparatus 400 is similar to the housing 105 illustrated in FIGS. 2-6.

In the illustrated embodiment, the housing 405 is formed from a substantially conductive material, such as metal. In other embodiments, the housing 405 is formed from a substantially non-conductive material, such as plastic, and at least a portion of the housing 405, such as, for example, the top wall 420, is coated with a layer of substantially conductive material. In further embodiments, at least a portion of the housing 405 is formed from a substantially translucent material, such as, for example, the sidewall 410, and at least another portion of the housing 405, such as, for example, the topwall 420, is formed from a substantially conductive material or coated with a substantially conductive material. In still further embodiments, the housing 405 is formed from a substantially non-conductive material and a substantially conductive plate (not shown) is coupled to the topwall 420 of the housing 405.

The apparatus 400 also includes an antenna module or antenna 450 for transmitting and/or receiving wireless signals. Similar to the antenna 205 illustrated in FIGS. 2-5, the antenna 450 transmits and receives signals at approximately 900 MHz using a direct sequence spread spectrum modulation technique. In some constructions, the antenna 450 transmits and/or receives signals at another frequency and/or uses a different modulation technique.

The antenna 450 includes a radiating element 460. In the embodiment shown, the conductive housing 405 serves as the ground plane and is included in the antenna. In other embodiments, a portion of the housing 405, such as, for example, the topwall 420, is conductive and serves as the ground plane for the radiating element 460. In further embodiments, the ground plane is separate from the housing 450, such as, for example, a conductive plate (not shown) coupled to the topwall 420 of the housing 405 and positioned substantially underneath a portion of the radiating element 460.

As shown in FIG. 7, the radiating element 460 extends through the second aperture 422 of the housing 460. In other embodiments, a portion of the radiating element 460 extends through the second aperture 422. In the illustrated embodiment, the radiating element 460 couples to the RF communication card 220. In other embodiments, the antenna 450 couples to the RF communication card 220.

In some embodiments (not shown), the apparatus 400 may include a photocell or photocell circuit similar to the photocell circuit 230 illustrated in FIGS. 2-5.

Thus, the invention provides, among other things, a wireless communication system adapted to be mounted on an elevated surface having a single housing or cover. Various features of the invention are set forth in the following claims.

The invention claimed is:

1. A wireless communication apparatus adapted to be mounted on an elevated surface having an electrical socket thereon, the apparatus comprising:
    a housing at least partially defining an interior space and having a portion which is translucent;
    a photocell supported by the housing in the interior space so that ambient light exterior to the housing passes through the translucent portion to the photocell; and
    a communication card supported by the housing in the interior space, the communication card including a transceiver;
    wherein the communication card is configured to perform gateway functions.

2. The wireless communication apparatus as set forth in claim 1, and further comprising an electrical connector supported by the housing and being adapted to be connected to the electrical socket so that when the electrical connector is connected to the electrical socket, the housing is supported on the elevated surface.

3. The wireless communication apparatus as set forth in claim 2, and wherein the electrical connector includes a switched-line terminal, and wherein the photocell is coupled to the switched-line terminal.

4. The wireless communication apparatus as set forth in claim 1, and wherein the photocell is positioned adjacent the translucent portion of the housing.

5. The wireless communication apparatus as set forth in claim 1, and further comprising an antenna coupled to the transceiver, and wherein the antenna is positioned within the interior space of the housing.

6. The wireless communication apparatus as set forth in claim 5, and wherein the antenna includes a radiating element and a ground plane.

7. The wireless communication apparatus as set forth in claim 5, and wherein the antenna includes a radiating element and a ground plane, and wherein the ground plane is at least a portion of the housing.

8. The wireless communication apparatus as set forth in claim 1, and further comprising a circuit support supported by the housing and positioned within the interior space of the housing, the circuit support at least partially defining an area for positioning an electrical circuit.

9. The wireless communication apparatus as set forth in claim 8, and wherein the communication card is supported by the circuit support.

10. The wireless communication apparatus as set forth in claim 8, and further comprising:
    an electrical connector supported by the housing and being adapted to be connected to the electrical socket so that when the electrical connector is connected to the electrical socket, the housing is supported on the elevated surface; and
    a power circuit coupled to the electrical connector, the power circuit supported by the circuit support.

11. The wireless communication apparatus as set forth in claim 1, and further comprising a first circuit support, a second circuit support and a third circuit support, each circuit support positioned within the interior space of the housing and at least partially defining an area for positioning an electrical circuit.

12. The wireless communication apparatus as set forth in claim 11, and further comprising:
    an electrical connector supported by the housing and being adapted to be connected to the electrical socket; and
    a power circuit supported by the first circuit support and coupled to the electrical connector; and
    wherein the communication card is a radio frequency ("RF") communication card supported by the second circuit support and coupled to the power circuit, the RF communication card including the transceiver; and
    wherein the third circuit support supports the photocell, the photocell positioned adjacent the translucent portion of the housing.

13. The wireless communication apparatus as set forth in claim 12, and further comprising an antenna coupled to the RF communication card, the antenna configured to transmit and receive RF communication signals.

14. The wireless communication apparatus as set forth in claim 13, and wherein the antenna includes a radiating element and a ground plane, and wherein the antenna is positioned substantially above the ground plane.

15. The wireless communication apparatus as set forth in claim 14, and wherein the electrical connector includes a switched-line terminal, the photocell coupled to the switched-line terminal.

16. The wireless communication apparatus as set forth in claim 1, and wherein the elevated surface is a surface of a light fixture and the electrical socket is positioned on the surface of the light fixture, and further comprising an electrical connector supported by the housing and being adapted to be connected to the electrical socket so that when the electrical connector is connected to the electrical socket, the housing is supported on the surface of the light fixture.

17. A wireless communication system adapted to be mounted on an elevated surface having an electrical socket thereon, the apparatus comprising:
    a housing at least partially defining an interior space;
    an electrical connector supported by the housing and being adapted to be connected to the electrical socket;
    a power circuit coupled to the electrical connector and positioned within the interior space of the housing;
    a communication card including a transceiver, the communication card supported by the housing and positioned within the interior space of the housing; and
    an antenna coupled to the transceiver and positioned within the interior space of the housing; and
    wherein the communication card is configured to perform gateway functions.

18. The wireless communication system as set forth in claim 17, and further comprising a photocell coupled to the electrical connector and positioned within the interior space of the housing, and wherein at least a portion of the housing is formed from a substantially translucent material.

19. The wireless communication system as set forth in claim 17, and further comprising a plurality of circuit supports, and wherein each circuit support is supported by the housing and partially defines an area for positioning an electrical circuit.

20. The wireless communication system as set forth in claim 19, and wherein the plurality of circuit supports includes a first circuit support and a second circuit support, such that the first circuit support supports the power circuit, and the second circuit support supports the transceiver.

21. The wireless communication system as set forth in claim 17, and wherein the system is configured to mount to a light fixture.

22. An apparatus adapted to be mounted on an elevated surface having an electrical socket for distributing electrical power, the apparatus comprising:
   a housing at least partially defining an interior space;
   an electrical connector supported by the housing and being adapted to be connected to the electrical socket, so that when the electrical connector is connected to the electrical socket, the housing is supported directly on the elevated surface;
   an antenna supported by the housing;
   a circuit support supported by the housing and extending perpendicular from a base of the housing into the interior space of the housing, the circuit support at least partially defining an area for positioning an electrical circuit; and
   a radio frequency ("RF") communication circuit coupled to the antenna and configured to perform gateway functions.

23. The apparatus as set forth in claim 22, and further comprising a second circuit support supported by the housing and positioned within the interior space of the housing, and wherein the second circuit support at least partially defines a second area for positioning a second electrical circuit.

24. The apparatus as set forth in claim 23, and further comprising:
   a power circuit coupled to the electrical connector and supported by the circuit support; and
   the radio frequency ("RF") communication circuit coupled to the power circuit and supported by the second circuit support and including one of a transmitter, a receiver and a transceiver.

25. The apparatus as set forth in claim 23, and further comprising a third circuit support supported by the housing and positioned within the interior space of the housing, the third circuit support at least partially defining a third area for positioning a third electrical circuit.

26. The apparatus as set forth in claim 25, and further comprising:
   a power circuit coupled to the electrical connector, the power circuit supported by the circuit support; and
   the radio frequency ("RF") communication circuit coupled to the power circuit, the RF communication circuit including one of a transmitter, a receiver and a transceiver, and wherein the RF communication circuit is supported by the second circuit support.

27. The apparatus as set forth in claim 26, and further comprising a photocell circuit coupled to the electrical connector and supported by the third circuit support.

28. The apparatus as set forth in claim 27, and wherein a portion of the housing is formed from a substantially translucent material.

29. The apparatus as set forth in claim 28, and wherein the photocell circuit is positioned within the interior space of the housing adjacent the translucent portion of the housing such that ambient light exterior to the housing passes through the translucent potion to the photocell circuit.

30. The apparatus as set forth in claim 22, and further comprising a power circuit coupled to the electrical connector and supported by the circuit support.

31. The apparatus as set forth in claim 22, and further comprising a transceiver coupled to the antenna and supported by the circuit support.

32. The apparatus as set forth in claim 22, and wherein the radio frequency ("RF") communication circuit is supported by a second circuit support.

33. The apparatus as set forth in claim 32, and wherein the RF communication circuit includes one of a transmitter, a receiver and a transceiver.

34. The apparatus as set forth in claim 22, and wherein the circuit support includes a plurality of circuit supports positioned within the interior space of the housing.

\* \* \* \* \*